United States Patent [19]

Bezette et al.

[11] Patent Number: 4,562,974
[45] Date of Patent: Jan. 7, 1986

[54] ROCK BREAKING APPARATUS

[75] Inventors: Ian G. Bezette, "Talisker", Evandale, Tasmania; David B. Sugden, Tasmania, both of Australia

[73] Assignees: Ian G. Bezette; John Bennetto, both of Australia

[21] Appl. No.: 522,301

[22] PCT Filed: Nov. 24, 1982

[86] PCT No.: PCT/AU82/00196
§ 371 Date: Nov. 24, 1981
§ 102(e) Date: Jul. 20, 1983

[87] PCT Pub. No.: WO83/01977
PCT Pub. Date: Jun. 9, 1983

[30] Foreign Application Priority Data

Nov. 24, 1981 [AU] Australia ................ PF1683

[51] Int. Cl.$^4$ ............................................ B02C 1/00
[52] U.S. Cl. ...................................... 241/283; 173/139; 267/137
[58] Field of Search ................ 173/139, 162 R; 145/29 A, 29 B, 30.5; 267/137, 141.1, 141.2; 241/283, 270, 273

[56] References Cited

U.S. PATENT DOCUMENTS 2,899,934 8/1959 Salengro ................ 173/139 X
3,010,430 11/1961 Allen et al. ............. 173/139 X

FOREIGN PATENT DOCUMENTS 140465 6/1921 United Kingdom ............ 267/141.1

Primary Examiner—Howard N. Goldberg
Assistant Examiner—Timothy U. Eley
Attorney, Agent, or Firm—Diller, Ramik & Wight

[57] ABSTRACT

A tool assembly (4) for working a material (R) such as breaking rock. Assembly (4) includes a tool mounting (17) having a fixed section (18), and a movable section (19) for movement relative to the fixed section (18) in a working direction ($D_W$) and an opposite return direction ($D_R$). A tool (34) is mounted on the movable section (19) for movement relative thereto in the working direction ($D_W$) and return direction ($D_R$). Limit means (49,50) on tool (34) limits relative movement between tool (34) and movable section (19) to between a tool operative position and a tool operated position. During a working stroke, tool (34) is engaged with material (R) and moved in working direction ($D_W$) from the operative position to the operated position and thereafter in unison with the movable section (19) under action of a working force applied to tool (34) thereby to work material (R). The tool assembly (4) also includes biasing means (29) acting between the fixed section (18) and movable section (19) to absorb the applied tool working forces transferred from tool (34) to the movable section (19), and also to provide a restoring force to the movable section (19) for returning the movable section (19) in return direction ($D_R$) upon conclusion of the working stroke of the tool (34).

26 Claims, 4 Drawing Figures

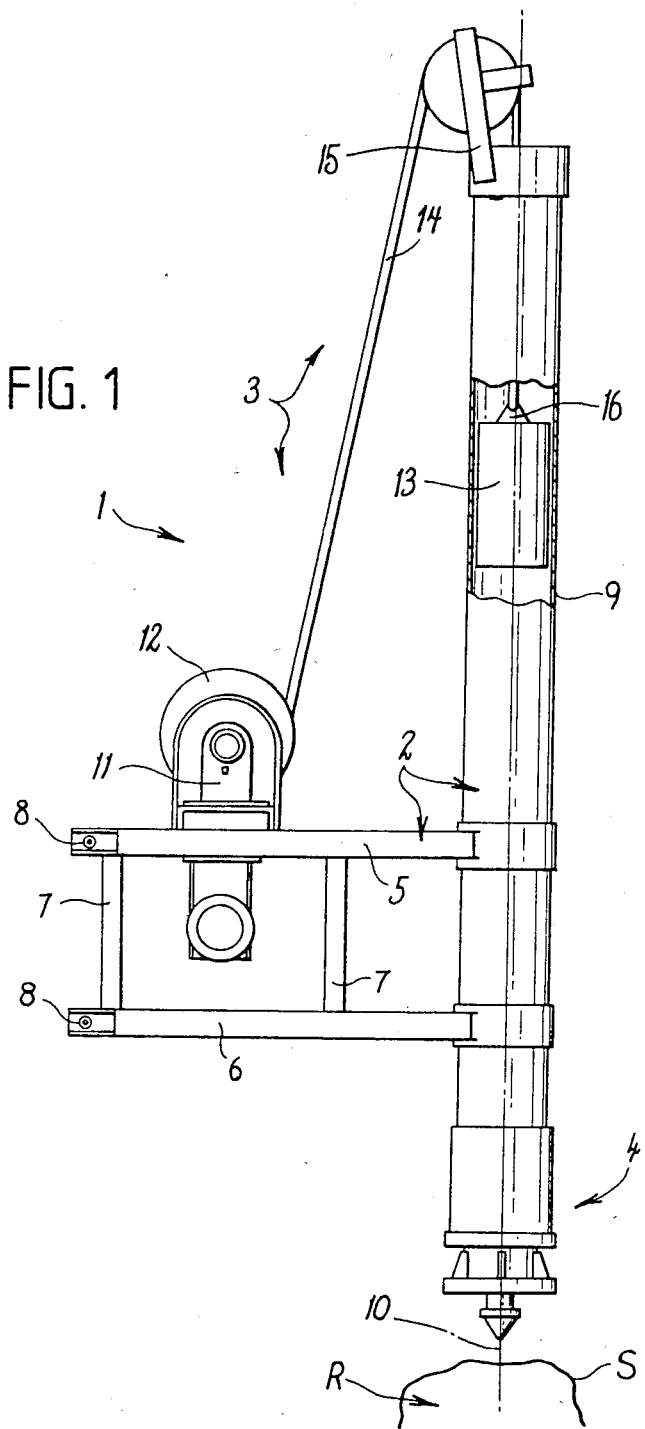

ROCK BREAKING APPARATUS

This invention relates generally to apparatus for working materials, such as reducing rock by fracturing it into small sections suitable for handling, and particularly to a tool assembly which can be used in that apparatus.

One such type of apparatus and tool assembly therefor has been disclosed in Applicant's earlier Australian Pat. No. 522,890. That tool assembly includes a tool having limit means by which the tool is secured to a tool mounting for limited movement relative to the mounting between a tool operative position and a tool operated position, the tool being engageable with material to be worked and during a material working stroke moving from the operative position to the operated position under action of an applied working force to work the material. The apparatus includes a frame adapted to be mounted on a vehicle, the above tool assembly mounted on that frame, and a striker block adapted to be raised so that it is spaced from the tool and allowed to fall under gravity to strike and apply the working force to the tool thereby to move the tool from its operative position to its operated position.

Whilst the apparatus of Applicant's prior patent is generally satisfactory in operation, it has been found that, if the striker block is operated to move the tool from its operative to its operated position during a rock breaking operation, and particularly when the tool is not properly positioned on the rock or the rock is easily fractured, the striker block tends to move the tool to its operated position with such a working force that potentially damaging stresses and vibrations are transmitted through the apparatus. This is the result of absorption by the tool mounting and apparatus of the working forces once the tool has reached its operated position and further movement thereof is resisted by the limit means and tool mounting.

It is an object of the present invention to avoid that disadvantage of the above type of apparatus and tool assembly through the provision of an alternative simple tool assembly.

With the above object in mind, the present invention provides a tool assembly for working a material, including: a tool mounting having a fixed section, and a movable section mounted for movement relative to the fixed section in a working direction and an opposite return direction; a tool mounted on the movable section for movement relative thereto in the working and return directions, and having limit means for limiting that relative movement of the tool relative to the movable section to between a tool operative position and a tool operated position, the tool during a working stroke being engaged with material to be worked and moved in the working direction from the operative position to the operated position and thereafter in unison with the movable section relative to the fixed section under action of an applied working force thereby to work the material; and, biasing means acting between the fixed section and the movable section to absorb applied tool working forces transferred from the tool to the movable section, and to provide a restoring force to the movable section for returning the movable section in the return direction upon conclusion of the working stroke of the tool.

Preferably, the tool mounting is generally elongated with the fixed section and movable section thereof being longitudinally movable relative to each other in the working and return directions. That longitudinal movement is preferably coincident with the movement of the tool so that unitary movement of the tool and nose section is in the working direction during a material working stroke.

Preferably, the tool mounting has generally tubular fixed and movable sections telescopically movable one relative to the other, the movable section telescopically sliding relative to the fixed section during movement thereof in the working and return directions. In one embodiment, those sections are of generally annular configuration with the movable section telescopically movable in the fixed section. In one embodiment, the movable section is smoothly slidable within the fixed section and, to that end, each section includes a bearing element such as a bearing ring which slidably engages the other section.

In one embodiment, the fixed section also includes an open ended tubular fixed sleeve mountable to the apparatus. The fixed sleeve may be permanently or removably mounted on the apparatus. In one embodiment, the movable section also includes an open ended tubular movable sleeve slidably positioned in the fixed sleeve. In this embodiment, the movable sleeve has a nose portion projecting out from the fixed sleeve and which moves away from the fixed sleeve during movement of the movable section in the working direction, and moves toward the fixed sleeve during movement of the movable sleeve in the return direction.

In one embodiment, the fixed sleeve is spaced apart from the movable sleeve and the bearing elements are located therebetween. Those bearing elements may be permanently or removably mounted on their respective sleeves.

Preferably, the biasing means is resilient and positioned between the fixed and movable sections. As a result, movement of the movable section in the working direction causes compression of the biasing means between the fixed and movable sections. In addition, that compression preferably provides the restoring forces for returning the movable section.

In one embodiment, the biasing means includes a plurality of resilient biasing members extending about the periphery of the movable sleeve between the fixed sleeve and movable sleeve, and arranged so as to resiliently bias the movable section telescopically into the fixed section in the return direction. Those biasing members preferably coact between opposed abutment faces provided on the bearing elements of the fixed and movable sections to move those elements apart. The biasing members are preferably stacked between those abutment faces.

In one embodiment, the biasing members may be biasing rings. Those rings may be composed of an elastomeric material, such as rubber. Moreover, those rings may each have a common shape although in one embodiment the cross-sectional configuration of successive rings alternates between circular and rectangular. In this one embodiment the rings are closely fitted between and engage the fixed and movable sleeves.

Preferably, the movable section further includes a tool support removably mounting the tool to the movable sleeve. That tool support preferably has a bore extending therethrough and in which the tool is slidably mounted for movement between the operative and operated positions.

In one embodiment, the tool support includes a carrier plate of generally annular configuration, defining an insert aperture, removably at the nose portion mounted of the movable sleeve so as to extend in a plane generally perpendicular to the longitudinal axis of that sleeve and with the longitudinal axes generally coaxial with each other.

In this one embodiment, the tool support also includes an abutment plate mounted in the insert aperture, that abutment plate actually defining the bore for the tool. In this embodiment, the abutment plate is seated in the insert aperture and frictionally engages the carrier plate for retention therein. That is achieved by correspondingly shaping the peripheral edge faces of the abutment plate and carrier plate insert aperture so that they frictionally interengage. Those peripheral faces may be shaped so as to converge in the working direction, and that convergence may be constant, or step or gradually varied along its axial extent. In this way, during operation of the tool assembly, the abutment plate will be continually forced into seating engagement with the carrier plate yet can be relatively easily removed from that plate by striking in a return direction. The abutment plate may be axially split into at least two sections so as to allow replacement and removal of the tool in the bore.

In this one embodiment, the tool support further includes a backing plate which at least substantially overlies the carrier plate and the abutment plate to retain the abutment plate in the insert aperture against removal upon accidental striking in the return direction. That backing plate, in this embodiment, is of generally annular configuration, defining a clearance aperture, coaxial of the bore, and through which the tool extends.

Preferably, the tool of the tool assembly has a generally elongated cylindrical body extending through the bore in the tool support for longitudinal sliding movement in the working and return directions between the operative and operated positions. Preferably, the tool has a head at one end of the tool body with a working tip which is engageable with the material to be worked during tool assembly operation. Preferably, that tool head is a block-like member having two opposed sides tapering toward each other forwardly of the tool body so as to define the working tip.

Preferably, the limit means of the tool is a pair of spaced apart limit members positioned one adjacent each end of the tool body. Those two limit members are preferably of a larger diameter than the diameter of the bore so that they act to limit movement of the tool between the operative and operated positions by respectively abutting against the abutment plate. In one embodiment, those limit members are limit collars secured to or integral with the tool body and during assembly operation abut the abutment plate to limit tool movement.

The present invention also provides apparatus for working a material including: an apparatus frame; the above tool assembly secured to the frame; and, actuating means operable to apply the tool working forces to the tool.

The apparatus to which the tool assembly of the present invention may form part is preferably generally as disclosed in Applicant's prior patent 522,890. In that regard, the apparatus frame is preferably adapted to mount the apparatus on a vehicle having a hydraulic system and lifting and tilt rams, such as to the front end of a front end loader tractor or to the three point linkage at the rear of a tractor.

The apparatus actuating means preferably includes a striker member which, in use, engages the tool when it is in its operative position to apply the working forces thereto to move the tool to the operated position. In one embodiment that striker member is a striker block which can be raised and allowed to fall under the effect of gravity to strike the tool.

Preferably, the apparatus frame includes a tubular guide column arranged, in use, generally vertically so that the striker member moves thereon during use of the apparatus. That guide column preferably has an upper end portion, and a lower end portion on which the tool assembly is mounted. The guide column in one embodiment is provided by a reinforced steel pipe along which the striker block moves.

The apparatus actuating means preferably also includes drive means for raising the striker member and allowing it to fall along the guide column. That drive means preferably includes a drive motor, such as one driven by pressurised hydraulic fluid supplied from the vehicle, mounted on the frame and operatively connected to the striker member. That operative connection is preferably effected by a rope or wire having one end connected to the striker member and the other end connected to a rotatable drum winch such that the rope or wire can be wound therearound so as to raise the striker member and released therefrom so as to allow the striker member to fall. The drum winch is in turn preferably operably connected with the drive motor through a suitable clutch provided to engage or disengage the drum winch from the drive motor when desired.

The following description refers in more detail to the various features of the apparatus and tool assembly of the present invention. To facilitate an understanding of the invention, reference is made to the accompanying drawings where these features are illustrated in a specific preferred embodiment. It is to be understood that the features of the invention are not limited to the specific embodiment as illustrated in the drawings.

In the drawings:

FIG. 1 is a side elevation partly in section of apparatus with tool assembly according to a preferred embodiment of the present invention;

Figure 3:
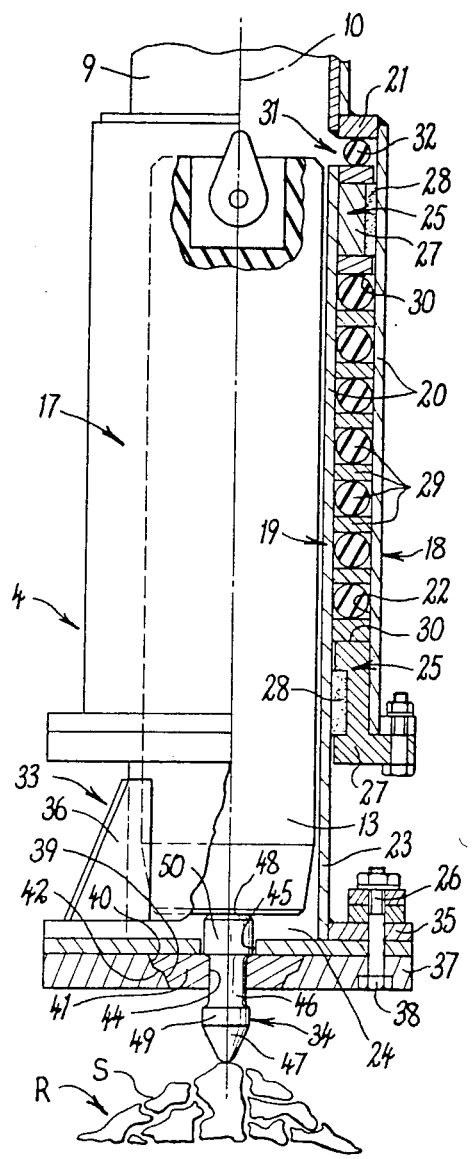
FIG. 3 is the tool assembly of FIG. 2 during a working stroke of the tool.

Referring initially to FIG. 1 there is generally illustrated apparatus 1, for breaking rock piece R. Apparatus 1, includes apparatus frame 2, supporting tool actuating means 3, and tool assembly 4, actuation of actuating means 3, operating tool assembly 4, for a spalling operation on rock piece R.

Apparatus frame 2, includes upper and lower frame members 5,6, secured together such as by one or more struts 7. Each of upper and lower frame members 5,6, is provided with mounting aperture 8, by which apparatus 1, can be mounted on a vehicle (not shown), such as a front end loader tractor, for transportation and manipulation during use of apparatus 1.

Frame 2, also includes tubular, open ended guide column 9, rigidly secured to frame members 5,6, such as by welding thereto. Guide column 9, has longitudinal axis 10, which during operation of apparatus 1, extends generally vertically as will become more apparent hereinafter.

Actuating means 3, includes drive motor 11, securely mounted on upper frame member 5, drivingly connected to drum winch 12, through a suitable clutch (not shown) for engaging and disengaging drum winch 12, from drive motor 11. Drive motor 11, may be of any suitable construction and in that regard may be driven by pressurised hydraulic fluid supplied by the transportation vehicle (not shown). Actuating means 3, also includes striker block 13, located within guide column 9, for sliding movement therealong, striker block 13, being connected to drum winch 12, for movement thereby through connecting cable 14, which extends from drum winch 12, over guide pulley 15, and into guide column 9, to striker block 13. Striker block 13, includes connection bracket 16, to facilitate cable connection thereto.

Figure 2:
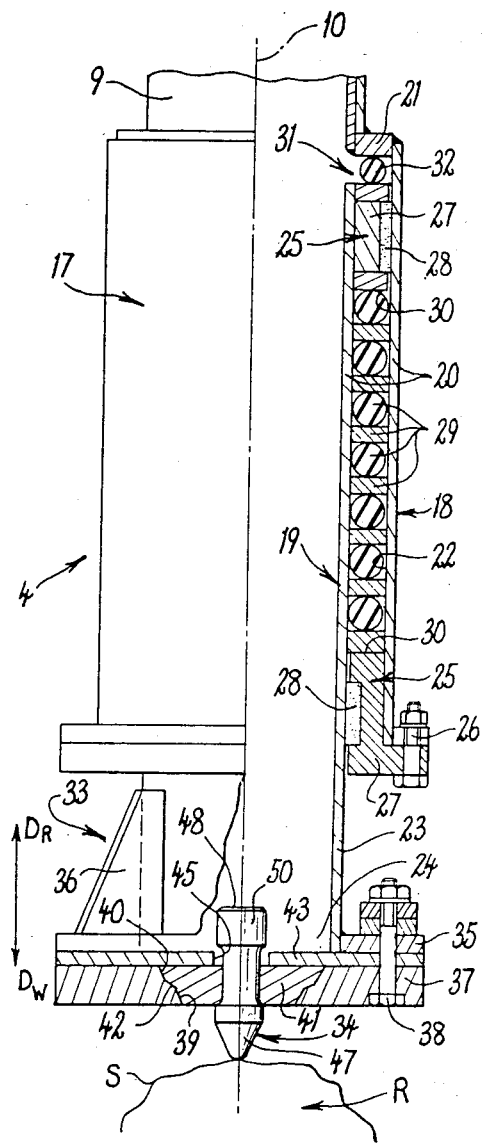
FIG. 2 is a detailed side elevation partly in section of the tool assembly of FIG. 1, showing the assembly prior to a working stroke of the tool.
Figure 4:
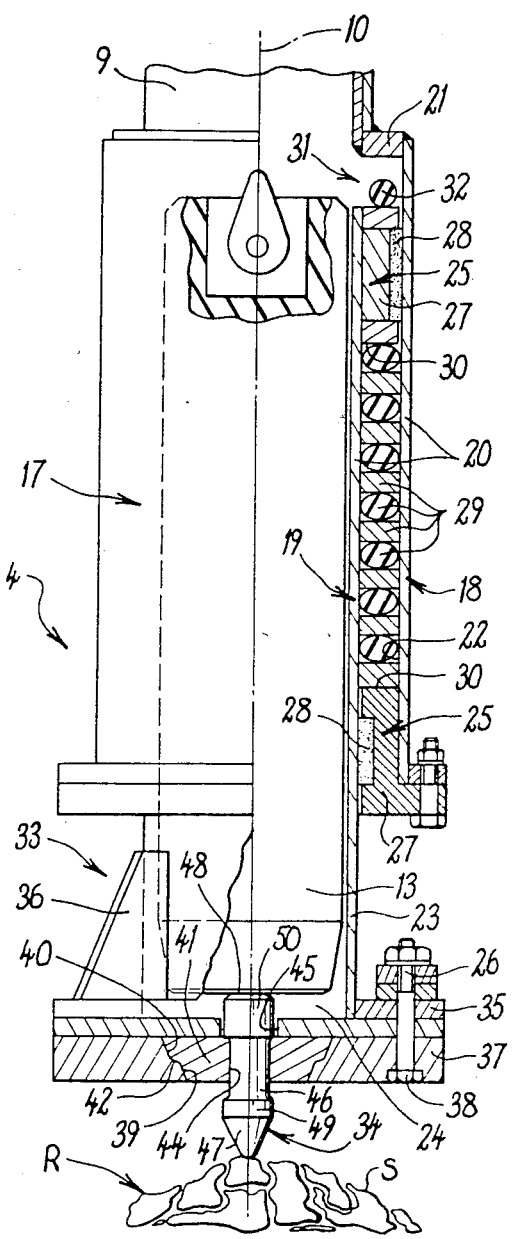
FIG. 4 is the tool assembly of FIG. 2 at the conclusion of the working stroke of the tool.

Tool assembly 4, is illustrated in more detail in FIGS. 2 to 4, and includes elongated tool mounting 17, secured to and generally forming a lower coextension to tubular guide column 9. Tool mounting 17, has fixed section 18, rigidly mounted on column 9, such as by welding thereto, and movable section 19, mounted in fixed section 18, for telescopic sliding movement relative thereto in a working direction $D_W$, and an opposite return direction $D_R$, along longitudinal axis 10.

Fixed section 18, and movable section 19, each include a respective open ended cylindrical sleeve 20, sized so as to be spaced apart from each other. The sleeve 20, of fixed section 18, forms shoulder 21, with guide column 9. The sleeve 20, of movable section 19, forms a coextension of guide column 9. As a result annular space 22, is defined between fixed section 18, and movable section 19. Sleeve 20, of movable section 19, is longer than sleeve 20, of fixed section 18, and has nose portion 23, projecting out of fixed section 18, to terminate in open end 24, spaced from fixed section 18.

Each of fixed section 18, and movable section 19, also has a bearing ring 25, secured to a respective sleeve 20, in spaced apart relationship and slidably engaging the other lseeve 20, so that movable section 19, is guided during sliding movement relative to fixed section 18. Bearing rings 25, close annular space 22.

Each bearing ring 25, may be secured to respective sleeve 20, in any suitable manner. In that regard, one bearing ring 25, may be permanently secured to sleeve 20, of movable section 19, such as by welding thereto, whilst the other bearing ring 25, may be removably secured to sleeve 20, of fixed section 18, such as by a plurality of fastening elements 26 (only one of which is illustrated). The bearing ring 25, of movable section 19, includes a unitary or fabricated bearing block 27, slightly spaced from sleeve 20, of fixed section 18. The bearing ring 25, of movable section 19, also includes bearing pad 28, supported within bearing block 27, and actually engaging sleeve 20, of fixed section 18.

Positioned within space 22, is a plurality of resilient biasing rings 29, extnding about sleeve 20, of movable section 19, and stacked between opposed abutment faces 30, conveniently provided by bearing blocks 27, of bearing rings 25. Biasing rings 29, alternate between circular and rectangular cross-sectional configurations and are sized so as to closely fit between sleeves 20. Each biasing ring 29, is composed of an elastomeric material, such as rubber.

Tool mounting 17, further includes limit stop 31, which acts to limit sliding movement of movable section 19, in return direction $D_R$. Limit stop 31, also acts with resilient biasing rings 29, to positively locate movable section 19, relative to fixed section 18. Limit stop 31, includes buffer ring 32, composed of an elastomeric material such as rubber mounted on bearing ring 25, of movable section 19, and arranged to abut shoulder 21, to limit movement of movable section 19. Buffer ring 31, acts to absorb any shock forces which may occur as a result of engagement with shoulder 21.

Tool assembly 4, also includes tool support 33, removably mounting tool 34, on nose portion 23, of movable section 19. Tool support 33, includes support flange 35, extending transversely of longitudinal axis 10, and rigidly secured adjacent open end 24, of nose portion 23, such as by welding thereto. Strengthening webs 36, assist in securing flange 35, to nose portion 23.

Tool support 33, also includes carrier plate 37, removably mounted on support flange 35, by a plurality of bolt fasteners 38, (only one of which is illustrated) spaced about support flange 35, and carrier plate 37. Carrier plate 37, has insert aperture 39, extending therethrough coaxially of longitudinal axis 10, and defined by peripheral face 40.

Mounted within insert aperture 39, is abutment plate 41, having peripheral face 42. Abutment plate 41, and carrier plate 37, lie coplanar of each other, with abutment plate 41, being supported within insert aperture 39, by frictional engagement between peripheral faces 40, and 42. To that end, faces 40, and 42, correspondingly converge across carrier plate 37, and abutment plate 41, respectively in working direction $D_W$. The angle of that convergence changes twice so that those faces 40, and 42, are of a stepped nature. In this way, abutment plate 41, is supported by carrier plate 37, and prevented from moving out of insert aperture 39, in working direction $D_W$, during operation of apparatus 1.

To prevent abutment plate 41, from accidentally coming out of insert aperture 39, in return direction $D_R$, tool support 33, is further provided with backing plate 43, generally overlying carrier plate 37, and abutment plate 41, and sandwiched between support flange 35, and carrier plate 37. Thus, abutment plate 41, is positively held within insert aperture 39, during apparatus 1, operation but can be relatively easily removed therefrom upon dismantling of tool support 33.

Tool 34, is mounted in bore 44, extending through abutment plate 41, and clearance aperture 45, extending through backing plate 43, bore 44, and aperture 45, lying coaxially of longitudinal axis 10. Abutment plate 41, may be split into a plurality of sections (not shown) so as to allow ready removal of tool 34, from bore 44, such as for replacement of tool 34, upon dismantling of tool support 33.

Tool 34, has cylindrical elongated body 46, slidably mounted within bore 44, and head 47, at one end of body 46, with a working tip which is engageable with a surface S, of rock piece R, during a spalling operation. Tool 34, also has striking face 48, formed at the other end of the tool body for striking with striker block 13, during operation of apparatus 1.

Tool 34, is freely slidable longitudinally within bore 44, but is limited as to the extent of that movement to between an operative position as illustrated in FIG. 2 and an operated position as illustrated in FIGS. 3 and 4. Limitation of that movement is achieved by means of a pair of spaced apart limit collars 49, and 50, each of which abut abutment plate 41, when tool 34, is respectively in its operative and operated positions. Limit collars 49, and 50, may be formed integral with tool body 46. As illustrated clearance aperture 45, is sized relative to limit collar 50, to allow clearance of collar 50, during movement of tool 34.

In operating the above described preferred embodiment of apparatus 1, the apparatus is initially mounted on to a vehicle of a preferred type and hydraulic drive motor 11, connected to the vehicle's hydraulic system. Apparatus 1, is then manoeuvred until guide column 9, and tool assembly 4, are positioned immediately above rock piece R, to be broken. Apparatus frame 2, is then lowered until head 47, of tool 34, rests directly on rock piece R, and tool 34, is urged into its operative position as illustrated in FIG. 2.

Striker block 13, is then completely raised within guide column 9, by drive motor 11, and upon operation of the clutch between motor 11, and drum winch 12, allowed to fall under action of gravity. In so falling, striker block 13, passes along guide column 9, and then along sleeve 20, of movable section 19, until it strikes striking face 48, of tool 34, and apply tool working forces thereto. In striking striking face 48, tool 34, is driven to its operated position and in doing so breaks rock piece R, as illustrated in FIG. 3.

As limit collar 50, of tool 34, engages abutment plate 41, movable section 19, is thereafter caused to move in unison with tool 34, for any further movement in the working direction $D_W$. That movement of movable section 19, is against the bias of resilient biasing rings 29, which in effect act to absorb the tool working forces transferred from limit collar 50, to abutment plate 41, which otherwise would have been transmitted to guide column 9, and frame 2. Movement of movable section 19, causes compression of resilient biasing rings 29, and that in turn causes creation of a restoring force within those rings 29, as illustrated in FIG. 4.

Unitary movement of movable section 19, and tool 34, continues until dissipation of tool working forces applied by striker block 13. Thereafter striker block 13, is disengaged from striking face 48, for raising within guide column 9, and that causes the restoring force within resilient biasing rings 29, to return movable section 19, in the return direction $D_R$, until buffer ring 32, abuts shoulder 21.

The tool assembly of the present invention minimises transmission of potentially damaging stresses and vibrations through the apparatus during operation of that apparatus. As such, the apparatus is less prone to damage so that its useful life may be maximised.

The tool assembly of the present invention and the apparatus incorporating that assembly is relatively simple in construction and operation so that its costs of purchase and maintenance may be minimal.

Finally, it should be understood that various modifications and/or alterations may be made without departing from the ambit of the present invention as defined in the claims appended hereto.

We claim:

1. A tool assembly for working a material, including: a tool mounting having a tubular fixed sleeve, and a tubular movable sleeve mounted for telescopic movement relative to the fixed sleeve in a working direction and an opposite return direction, the fixed and movable sleeve being laterally spaced apart thereby forming a space therebetween, the movable sleeve having a nose portion projecting out from the fixed sleeve which moves away from the fixed sleeve during movement of the movable sleeve in the working direction and moves toward the fixed sleeve during movement of the movable sleeve in the return direction; a tool mounted at the nose portion of the movable sleeve for movement relative thereto in the working and return directions, and having limit means adapted to abut the movable sleeve to limit that movement of the tool relative to the movable sleeve to between a tool operative position and a tool operated position, the tool during a working stroke thereof engaging material to be worked and being thereafter struck by a plunger block moving into and sliding along within the movable sleeve to apply a working force to the tool, the tool under action of the working force moving in the working direction from the operative position to the operated position and thereafter in unison with the movable sleeve relative to the fixed sleeve thereby to work the material; and, a plurality of biasing members stacked in seriatim along the space formed between the fixed and movable sleeves so as to extend between opposed abutment faces on the fixed and movable sleeves, the biasing members at least substantially filling the space with at least some of the biasing members slidably engaging both the fixed and movable sleeves, whereupon movement of the movable sleeve in the working direction resiliently compresses the biasing members between the fixed sleeve and the movable sleeve to absorb applied tool working forces transferred from the tool to the movable sleeve when the limit means abuts the movable sleeve as the tool reaches the tool operated position during a working stroke, compression of the biasing members providing a restoring force to the movable sleeve for returning the movable sleeve in the return direction upon conclusion of the working stroke of the tool.

2. A tool assembly as claimed in claim 1, wherein the fixed sleeve is spaced apart outwardly from the movable sleeve, the fixed sleeve having a bearing element mounted thereon and located between the spaced apart sleeves so as to slidingly engage the movable sleeve and the movable sleeve having a bearing element mounted thereon and located between the spaced apart sleeves so as to slidingly engage the fixed sleeve, the movable sleeve thereby being slidably mounted relative to the fixed sleeve.

3. A tool assembly as claimed in claim 2, wherein the opposed abutment faces are provided one each on a respective bearing element.

4. A tool assembly as claimed in claim 3, wherein each resilient biasing member is a biasing ring composed of an elastomeric material extending peripherally about the movable sleeve.

5. A tool assembly as claimed in claim 4, wherein the cross-sectional configuration of successive biasing rings alternates between circular and rectangular.

6. A tool assembly as claimed in claim 1, wherein the movable sleeve includes a tool support removably mounting the tool at the nose portion of the movable sleeve, the tool support having a bore extending therethrough in which the tool is slidably mounted for movement between the operative and operated positions thereof, and wherein the limit means abuts the tool support to limit movement of the tool relative to the movable sleeve.

7. A tool assembly as claimed in claim 6, wherein the tool support includes a carrier plate removably mounted on the nose portion and defining an insert aperture extending therethrough, and an abutment plate removably mounted in the insert aperture and defining the bore in which the tool is slidably mounted, peripheral faces of the carrier plate defining the insert aperture and of the abutment plate being correspondingly shaped so as to frictionally interengage thereby to retain the abutment plate within the insert aperture during working strokes of the tool.

8. A tool assembly as claimed in claim 7, wherein the peripheral faces correspondingly converge in the working direction.

9. A tool assembly as claimed in claim 7, wherein the abutment plate is comprised of at least two sections which are separable to permit removal of the tool from the bore.

10. A tool assembly as claimed in claim 7, wherein the tool support further includes a backing plate at least substantially overlying the carrier plate and the abutment plate to assist in retaining the abutment plate in the insert aperture.

11. A tool assembly as claimed in claim 1, wherein the tool has an elongated body longitudinally movable in the working and return directions, and a head at one end of the tool body with a working tip which is engageable with the material to be worked, and wherein the limit means includes a pair of spaced apart limit collars integral with the tool body and each arranged to abut the movable sleeve to limit movement of the tool in a respective working direction and return direction.

12. A tool assembly as claimed in claim 1, and further including a limit stop to limit return movement of the movable sleeve and, with the biasing elements, assist in positively locating the movable sleeve relative to the fixed sleeve.

13. The tool assembly as defined in claim 1 wherein at least one of said biasing members is generally circular in cross-sectional configuration.

14. The tool assembly as defined in claim 1 wherein at least one of said biasing members is generally polygonal in cross-sectional configuration.

15. The tool assembly as defined in claim 1 wherein at least one of said biasing members is generally circular in cross-sectional configuration and at least another of said biasing members is generally polygonal in cross-sectional configuration.

16. The tool assembly as defined in claim 1 including means for limiting the movement of the movable sleeve in the return direction, said limiting means including opposing faces between said movable and fixed sleeves, and means for preventing contact between said opposing faces by biasing the relative movement therebetween in the return direction.

17. The tool assembly as defined in claim 1 including means for limiting the movement of the movable sleeve in the return direction, said limiting means including opposing faces between said movable and fixed sleeves, means for preventing contact between said opposing faces by biasing the relative movement therebetween in the return direction, and said contact preventing means is an elastomeric ring.

18. The tool assembly as defined in claim 17 wherein at least one of said biasing members is generally circular in cross-sectional configuration and at least another of said biasing members is generally polygonal in cross-sectional configuration.

19. A tool assembly for working a material, including: a tool mounting having a tubular fixed sleeve, and a tubular movable sleeve mounted for telescopic movement relative to the fixed sleeve in a working direction and an opposite return direction, the fixed and movable sleeves being laterally spaced apart thereby forming a space therebetween, the movable sleeve having a nose portion projecting out from the fixed sleeve which moves away from the fixed sleeve during movement of the movable sleeve in the working direction and moves toward the fixed sleeve during movement of the movable sleeve in the return direction; a tool mounted at the nose portion of the movable sleeve for movement relative thereto in the working and return directions, and having limit means adapted to abut the movable sleeve to limit that movement of the tool relative to the movable sleeve to between a tool operative position and a tool operated position, the tool during a working stroke being engaged with the material to be worked and moved under action of an applied working force from the operative position to the operated position and thereafter in unison with the movable sleeve in the working direction relative to the fixed sleeve thereby to work the material; and, a plurality of biasing members stacked in seriatim along the space formed between the fixed and movable sleeves so as to extend between opposed abutment faces on the fixed and movable sleeves, the biasing members at least substantially filling the space with at least some of the biasing members slidably engaging both the fixed and movable sleeves, whereupon movement of the movable sleeve in the working direction resiliently compresses the biasing members between the fixed sleeve and the movable sleeve to absorb applied tool working forces transferred from the tool to the movable sleeve when the limit means abuts the movable sleeve as the tool reaches the tool operated position during a working stroke, compression of the biasing members providing a restoring force to the movable sleeve for returning the movable sleeve in the return direction upon conclusion of the working stroke of the tool.

20. The tool assembly as defined in claim 19 wherein at least one of said biasing members is generally circular in cross-sectional configuration.

21. The tool assembly as defined in claim 19 wherein at least one of said biasing members is generally polygonal in cross-sectional configuration.

22. The tool assembly as defined in claim 19 wherein at least one of said biasing members is generally circular in cross-sectional configuration and at least another of said biasing members is generally polygonal in cross-sectional configuration.

23. The tool assembly as defined in claim 19 including means for limiting the movement of the movable sleeve in the return direction, said limiting means including opposing faces between said movable and fixed sleeves, and means for preventing contact between said opposing faces by biasing the relative movement therebetween in the return direction.

24. The tool assembly as defined in claim 19 including means for limiting the movement of the movable sleeve in the return direction, said limiting means including opposing faces between said movable and fixed sleeves, means for preventing contact between said opposing faces by biasing the relative movement therebetween in the return direction, and said contact preventing means is an elastomeric ring.

25. The tool assembly as defined in claim 24 wherein at least one of said biasing members is generally circular in cross-sectional configuration and at least another of said biasing members is generally polygonal in cross-sectional configuration.

26. Apparatus for working a material, including: an apparatus frame; a tool mounting secured to the apparatus frame, the tool mounting having a tubular fixed sleeve, and a tubular movable sleeve mounted for telescopic movement relative to the fixed sleeve in a working direction and an opposite return direction, the fixed and movable sleeves being laterally spaced apart thereby forming a space therebetween, the movable sleeve having a nose portion projecting out from the fixed sleeve which moves awy from the fixed sleeve during movement of the movable sleeve in the working direction and moves toward the fixed sleeve during movement of the movable sleeve in the return direction; a tool mounted at the nose portion of the movable sleeve for movement relative thereto in the working and return directions, and having limit means adapted to abut the movable sleeve to limit that movement of the tool relative to the movable sleeve to between a tool operative position and a tool operated position; actuating means mounted on the apparatus frame for applying tool working forces to the tool, the tool during a working stroke being engaged with the material to be worked and moved under action of a working force applied by the actuating means from the operative position to the operated position and thereafter in unison with the movable sleeve in the working direction relative to the fixed sleeve thereby to work the material; and, a plurality of biasing members stacked in seriatim along the space formed between the fixed and movable sleeves so as to extend between opposed abutment faces on the fixed and movable sleeves, the biasing members at least substantially filling the space with at least some of the biasing members slidably engaging both the fixed and movable sleeves, whereupon movement of the movable sleeve in the working direction resiliently compresses the biasing members between the fixed sleeve and the movable sleeve to absorb applied tool working forces transferred from the tool to the movable sleeve when the limit means abuts the movable sleeve as the tool reaches the tool operated position during a working stroke, compression of the biasing members providing a restoring force to the movable sleeve for returning the movable sleeve in the return direction upon conclusion of the working stroke of the tool.

* * * * *